(12) United States Patent
Hong (10) Patent No.: US 10,176,713 B2
(45) Date of Patent: Jan. 8, 2019

(54) EMERGENCY ALERT AND WARNING APPARATUS

(71) Applicant: TLE, Inc, Suncheon-si (KR)

(72) Inventor: Yung Keun Hong, Suncheon-si (KR)

(73) Assignee: TLE. INC, Suncheon-si (KR)

( * ) Notice: Subject to any disclaimer, the term of this patent is extended or adjusted under 35 U.S.C. 154(b) by 0 days.

(21) Appl. No.: 15/568,827

(22) PCT Filed: Oct. 13, 2016

(86) PCT No.: PCT/KR2016/011472
§ 371 (c)(1),
(2) Date: Oct. 24, 2017

(87) PCT Pub. No.: WO2017/065511
PCT Pub. Date: Apr. 20, 2017

(65) Prior Publication Data
US 2018/0286230 A1 Oct. 4, 2018

(30) Foreign Application Priority Data

Oct. 16, 2015 (KR) .......................... 10-2015-0144506
Nov. 19, 2015 (KR) .......................... 10-2015-0162260

(51) Int. Cl.
*G08G 1/095* (2006.01)
*G08B 5/38* (2006.01)
(Continued)

(52) U.S. Cl.
CPC .............. *G08G 1/095* (2013.01); *G08B 3/10* (2013.01); *G08B 5/38* (2013.01); *G08B 25/10* (2013.01);
(Continued)

(58) Field of Classification Search
CPC .......... G08G 1/095; G08G 1/16; H02S 40/38; H02S 99/00; G08B 3/10; G08B 5/38; G08B 25/10
See application file for complete search history.

(56) References Cited

U.S. PATENT DOCUMENTS 3,938,080 A * 2/1976 Hulme .................. G08B 5/006
340/908.1
5,552,767 A * 9/1996 Toman .................. G08B 5/006
340/331
(Continued)

FOREIGN PATENT DOCUMENTS

JP          2004027528 A  *  1/2004
KR       100899118 B1  *  5/2009  .............. G08G 1/04
(Continued)

*Primary Examiner* — Quang Pham
(74) *Attorney, Agent, or Firm* — Lex IP Meister, PLLC (57) ABSTRACT

The present invention relates to an emergency alert and warning apparatus and, more particularly, to a road emergency alert and warning apparatus which is installed on a median strip or a guide rail of an expressway or the like to alert a driver of a rear vehicle of an emergency situation when a traffic accident occurs during nighttime driving, thereby preventing an additional secondary accident. According to an embodiment of the present invention, the emergency alert and warning apparatus comprises: an operation switch which is installed on a median strip or a guide rail of a road to allow a user to generate an operation signal when a traffic accident occurs; a control unit which receives the operation signal to output a control signal, and transmits or relays traffic accident notification data to another neighboring emergency alert and warning apparatus through a wired or wireless communication; a warning display unit which is installed rearward with respect to a traveling direction of a vehicle and includes a plurality of LEDs that are turned on and off in response to the control signal of the (Continued)

control unit; and a photovoltaic cell which converts solar energy into electric energy, processes the electric energy into a constant voltage through a DC/DC converter, and supplies power.

10 Claims, 8 Drawing Sheets

(51) Int. Cl.
    *G08B 3/10*         (2006.01)
    *H02S 99/00*       (2014.01)
    *H02S 40/38*       (2014.01)
    *G08B 25/10*      (2006.01)
    *G08G 1/16*        (2006.01)

(52) U.S. Cl.
    CPC .............. *H02S 40/38* (2014.12); *H02S 99/00* (2013.01); *G08G 1/16* (2013.01)

(56) References Cited

U.S. PATENT DOCUMENTS

| | | | | |
|---|---|---|---|---|
| 5,673,039 A * | 9/1997 | Pietzsch | ................. | G08G 1/015 340/332 |
| 5,864,304 A * | 1/1999 | Gerszberg | ............... | B61L 29/18 246/122 R |
| 6,559,774 B2 * | 5/2003 | Bergan | ................... | G08G 1/081 340/907 |
| 9,453,309 B2 * | 9/2016 | Moran | ...................... | E01F 9/30 |
| 2013/0113618 A1 * | 5/2013 | Flanagan | ............... | G08G 1/166 340/539.1 |
| 2014/0118553 A1 * | 5/2014 | Diba | ...................... | G08G 1/087 348/149 |
| 2014/0139358 A1 * | 5/2014 | Lee | .......................... | G08G 1/07 340/907 |

FOREIGN PATENT DOCUMENTS

| | | | |
|---|---|---|---|
| KR | 101011374 B1 | * | 1/2011 |
| KR | 101376026 B1 | * | 3/2014 |
| KR | 20140126037 A | * | 10/2014 |

* cited by examiner

EMERGENCY ALERT AND WARNING APPARATUS

TECHNICAL FIELD

The present invention relates generally to an emergency alert and warning apparatus. More particularly, the present invention relates to an emergency alert and warning apparatus provided on a median strip or a guide rail of an expressway or the like to alert a following vehicle driver to an emergency situation when a traffic accident occurs during nighttime driving, thereby preventing a secondary accident.

BACKGROUND ART

Generally, a shoulder refers to both edges of a highway or a motorway, and is used as a stopping space in an emergency of a vehicle or as a moving path of an emergency vehicle.

Accordingly, most of the vehicle drivers stop at the shoulder to solve a problem when the problem such as an abnormality occurs in the vehicle while driving or when an accident occurs.

Here, the vehicle driver sets a safety tripod about 100 to 200 meters behind the vehicle to prevent an additional accident by warning vehicles in motion that the vehicle is stopped on the shoulder.

However, it is difficult to install the safety tripod due to vehicles that moves at a high speed in an expressway or a motorway, and there is a risk of exposure to accidents while moving from the vehicle about 100 to 200 meters backward, particularly at night.

In other words, when an accident occurs on an expressway or the like, the following vehicle driver is informed of the accident situation by a cumbersome and dangerous method in which the safety tripod should be set about 100 to 200 meters behind the accident vehicle while turning on the emergency light. While the emergency light is turned on and the tripod is set about 100 to 200 meters behind the accident vehicle, dozens of vehicles are moving at high speed, which can lead to a more dangerous situation, and accidents that lead to loss of life due to vehicles coming from behind while taking these measures also often happen.

Meanwhile, a median strip or a guide rail provides information to the driver on the road ahead when driving at night, thereby preventing an accident where the vehicle leaves the road.

In the document of Korean Patent Publication Application No. 10-2008-0027034, "Median strip and guide rail reflector for monitoring forward accident area" is disclosed, in which a circular reflector is attached to an upper end of a round rod and a lower end thereof is hingedly fixed such that an angle of the upper end is arbitrarily changed, wherein the reflector is provided in a median strip and a guide rail at 10~20 m intervals, and the upper end is fixed using a connecting line, whereby when one reflector rod is manipulated, another reflector rod connected to the connecting line is moved together.

Accordingly, the angle of the reflector closest to the accident point is changed when an accident or dangerous situation occurs, whereby the angles of all reflectors connected to the connecting line are changed. Here, due to the angle change of the reflector, multiple reflectors attached additionally around the reflector are reflected to a following driver such that the driver can identify a dangerous situation from a distance and prevent additional accident. However, it is problematic in that the driver has a limit on identifying the reflector at night.

DISCLOSURE

Technical Problem

Accordingly, the present invention has been made keeping in mind the above problems occurring in the related art, and an object of the present invention is to provide an emergency alert and warning apparatus, which is provided in a median strip or a guide rail of an expressway or the like, to alert a driver of a following vehicle to an emergency situation when a traffic accident occurs during nighttime driving by using a warning sound or a warning light, so that the driver can slow down, thereby preventing a secondary accident and preventing a major traffic accident.

Technical Solution

In order to achieve the above object, according to one aspect of the present invention, there is provided an emergency alert and warning apparatus, which is provided on a median strip or a guide rail of a road at predetermined intervals, the emergency alert and warning apparatus including:

an operation switch allowing a user to generate an operation signal when a traffic accident occurs;

a control unit receiving the operation signal to output a control signal;

a warning display unit including a plurality of LEDs and being configured to be turned on and off in response to the control signal of the control unit to inform traffic accident; and a photovoltaic cell converting solar energy into electric energy and changing the electric energy into a constant voltage to supply power, wherein an ID is assigned to the emergency alert and warning apparatus and the control unit of the emergency alert and warning apparatus adds the ID to traffic accident notification data and relays the same to another neighboring emergency alert and warning apparatus; the control unit of the another neighboring emergency alert and warning apparatus is configured to output a control signal by receiving the traffic accident notification data when the traffic accident notification data includes a corresponding ID, and relays the traffic accident notification data having no corresponding ID to a further neighboring emergency alert and warning apparatus, whereby the traffic accident notification data is transmitted only to a rear emergency alert and warning apparatus near the traffic accident having the ID added to the traffic accident notification data; and the warning display unit is provided on a side opposite to a reflector of a delineator, the delineator is coupled to an upper portion of a strut of the median strip or the guide rail to be retractable like an antenna while being rotated at a predetermined angle.

Further, an inside of the delineator and an outside of the strut may be provided with contact terminals, and the contact terminals are brought into contact with each other or separated from each other by a rotation of the delineator to perform a function of an operation switch.

Further, the delineator may be configured such that the reflector normally faces a driver, and when a traffic accident occurs, the delineator is rotated at a predetermined angle by a motor such that the warning display unit faces the driver and then lights or flashes.

Further, the median strip or the guide rail may be provided with a separating plate coupled to at least one side of the strut to be deformed when the vehicle collides therewith, and the separating plate may be provided with a wavy first coupling hole to be horizontally long such that the separating plate is coupled to the strut by a first fastening means.

Further, the median strip or the guide rail may be provided with a shock absorber horizontally penetrating at least one side of the strut, and the shock absorber may be in a tubular shape and is provided with a wavy second coupling hole to be horizontally long such that the separating plate is coupled to the strut by a second fastening means, with the first fastening means protruding from a second side of the shock absorber through a first side thereof.

The emergency alert and warning apparatus may further include a sensor unit configured to output a sensing signal to the control unit by sensing an impact applied to the median strip or the guide rail, a speed or motion of a vehicle on the road, wherein the control unit determines whether the traffic accident occurs by the sensing signal and outputs the control signal.

The emergency alert and warning apparatus may further include a warning sound output unit constituted by a speaker or a buzzer and configured to output an announcement or a warning siren informing the traffic accident by the control signal of the control unit.

Further, the control unit may be provided with a timer to control the warning display unit and the warning sound output unit to be operated for a predetermined period of time, and the motor to be operated at a predetermined time.

The emergency alert and warning apparatus may further include a power supply device in a form of a battery or a rechargeable battery and configured to be charged by using constant voltage power supply of the photovoltaic cell and supply charged power.

Further, the traffic accident notification data may be assigned a brightness value of the warning display unit and be transmitted along with the ID assigned to the emergency alert and warning apparatus, and as an adjacent neighboring emergency alert and warning apparatus is more distant from a point of the traffic accident, the brightness value may be more less.

Advantageous Effects

According to the present invention, the emergency alert and warning apparatus, which is provided in a median strip or a guide rail of an expressway or the like, to alert a driver of a following vehicle to an emergency situation when a traffic accident occurs during nighttime driving by using a warning sound or a warning light, so that the driver can slow down, thereby preventing a secondary accident and preventing a major traffic accident.

MODE FOR INVENTION

Hereinbelow, configurations and operation of exemplary embodiments of the present invention will be described in detail with reference to the accompanying drawings.

Figure 1:
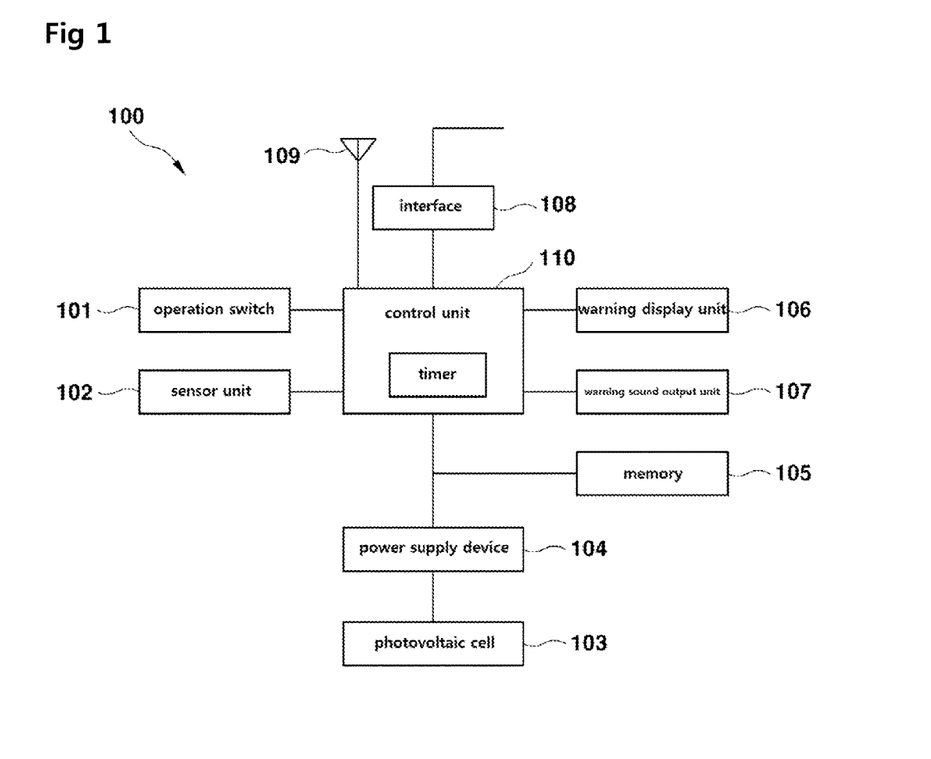
FIG. 1 is a block diagram showing a configuration of an emergency alert and warning apparatus according to an embodiment of the present invention.

FIG. 1 is a block diagram showing a configuration of an emergency alert and warning apparatus according to an embodiment of the present invention.

As shown in FIG. 1, an emergency alert and warning apparatus 100 includes an operation switch 101, a sensor unit 102, a photovoltaic cell 103, a power supply device 104, a memory 105, a warning display unit 106, a warning sound output unit 107, an interface 108, an antenna 109, and a control unit 110.

The emergency alert and warning apparatus 100 is provided in a median strip or a guide rail of an expressway or the like, and each is assigned a unique ID.

The operation switch 101 generates an operation signal by the user's operation and outputs the same to the control unit 110. The user can be a driver or a passenger of the vehicle which had an accident or an eyewitness to the accident.

For example, the operation switch 101 may be provided at an upper portion of the median strip or the guide rail.

The sensor unit 102 outputs a sensing signal to the control unit 110 by sensing the impact applied to the median strip or the guide rail due to an automobile accident, the speed or motion of the moving vehicle, and the brightness (illumination) of the surroundings.

The sensor unit 102 may include an impact sensor, a speed sensor, a motion sensor, and an illumination sensor. For example, in the case of the impact sensor, it is provided at the middle height of the median strip or the guide rail while being protected by a cushion member.

The sensor unit 102 is provided in case the driver or passenger of the vehicle which had an accident cannot operate the operation switch 101 due to a major traffic accident.

The power supply device 104 is a device for supplying power necessary for driving the emergency alert and warning apparatus 100.

The power supply device 104 may be constituted by a battery and a rechargeable battery, and other than these, it may be constituted by a secondary battery such as a lead battery, an alkaline battery, a gas battery, a lithium ion battery, a nickel hydrogen battery, a nickel cadmium battery, and a polymer battery.

The power supply device 104 can be charged by being supplied with power from the photovoltaic cell 103 or by being supplied with electricity from a commercial power source.

The photovoltaic cell 103 is provided at an upper portion of the emergency alert and warning apparatus 100 to face the sun.

The photovoltaic cell 103 converts solar energy into electric energy and processes the electric energy into a constant voltage, thereby supplying power to the power supply device 104.

The present invention is not limited thereto, and the photovoltaic cell 103 may supply power directly to the emergency alert and warning apparatus 100.

The warning display unit 106 is provided rearward with respect to a traveling direction of a vehicle and is constituted by a plurality of LEDs (light emitting diodes), and further includes a cover member (not shown) covering the plurality of LEDs.

The warning display unit 106 can be implemented in various sizes and shapes, and the cover member is made of a material and a color, which can be coupled with the warning display unit in various combinations, protect the LEDs from the outside environment, and improve the identification.

Further, the warning display unit 106 may display various characters, figures, arrows, or pictures as the LEDs flash sequentially or alternately by the control signal of the control unit 110 receiving the signals of the operation switch 101 and the sensor unit 102.

Further, the warning display unit 106 flashes at regular intervals by the control unit 110, thereby facilitating identification and adjusting the brightness (illumination) of the LEDs, and the emission color of the LEDs may be adjusted to enhance the identification. For example, red or yellow LEDs can be alternately arranged.

Further, if there is no signal from the operation switch 101 and the sensor unit 102 and no control signal from the control unit 110 is input, the warning display unit 106 is switched to an inactive mode to reduce the power consumption and increase the efficiency of the emergency alert and warning apparatus 100.

Further, switching between the inactive mode and the active mode of the warning display unit 106 is performed by the control unit 110.

The warning sound output unit 107 is provided rearward with respect to the traveling direction of the vehicle and is constituted by a speaker or a buzzer, and it is configured to output an announcement or a warning siren informing that a traffic accident has occurred ahead at regular intervals by the control signal of the control unit 110.

The memory 105 stores characters, figures, arrows, pictures, messages, a warning siren, and reference values that are used as criteria for traffic accident judgment by the control signal of the control unit 110 and can be implemented by various storage media.

The interface 108 is connected to another neighboring emergency alert and warning apparatus through a wired line and performs wired communication.

Further, wireless communication is performed between neighboring emergency alert and warning apparatuses through the antenna 109, wherein various wireless communication methods are used as follows: Bluetooth, which connects electronic/information devices wirelessly within a range of 10 m to 100 m using 2.45 GHz frequency; Zigbee, which is one of the IEEE 802.15.4 standards supporting short distance communication; and laser communication, which uses an infrared ray as a wireless communication medium.

The control unit 110 receives the operation signal of the operation switch 101 and the sensing signal of the sensor unit 102 to determine the accident situation of the vehicle, or daytime or nighttime.

For example, if the vehicle hits the median strip or the guide rail, the impact sensor constituting the sensor unit 102 senses an impact and transmits a sensing signal to the control unit 110, and in the control unit 110, the intensity of the impact is compared with the reference intensity stored in the memory 105. If the intensity is greater than the reference intensity, it is judged to be a traffic accident.

Further, the speed sensor constituting the sensor unit 102 senses the speed of the vehicle and transmits a sensing signal to the control unit 110, and in the control unit 110, if the driving speed is, for example, 0 km/h, it is judged as a traffic accident.

Further, the motion sensor constituting the sensor unit 102 senses the movement of the vehicle in motion and transmits a sensing signal to the control unit 110, and in the control unit 110, it is determined that there is a traffic accident if there is no vehicle movement.

Further, the illumination sensor constituting the sensor unit 102 measures the brightness (illumination) of the surroundings and transmits a sensing signal to the control unit 110, and in the control unit 110, the measured illumination is compared with the reference illumination stored in the memory 105, and if it is smaller than the reference illumination, it is determined to be nighttime.

If it is determined that the traffic accident has occurred or the operation signal is input, the control unit 110 outputs a control signal to the warning display unit 106 and/or the warning sound output unit 107, switches the electrical signal or power such that the LEDs of the warning display unit 106 flash sequentially or alternately according to the control signal, and outputs an accident announcement sound or warning siren to the warning sound output unit 107.

Here, the control unit 110 may cause the LED of the warning display unit to vary in brightness depending on the brightness value.

For example, the LEDs flash at 100% brightness at night when brightness value is very low, 75% brightness at sunrise or sunset, and 50% in the bright daylight.

Alternatively, if it is determined that a traffic accident has occurred in the daytime, the control signal may be output to the warning sound output unit 107 without outputting the control signal to the warning display unit 106.

Further, the control unit 110 has a timer itself such that the warning display unit 106 and the warning sound output unit 107 are operated for a predetermined period of time.

Further, the control unit 110 notifies the traffic alert notification data to another neighboring emergency alert and warning apparatus via the interface 108 or the antenna 109.

The operation switch 101, the sensor unit 102, the warning display unit 106, and the warning sound output unit 107 may be two when installed in the median strip.

Figure 2:
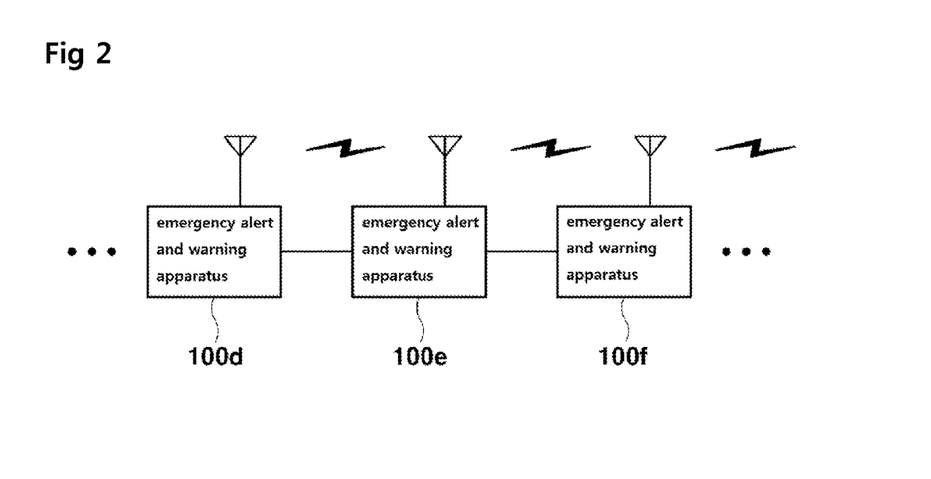
FIG. 2 is a view for explaining a communication method between the emergency alert and warning apparatuses shown in FIG. 1.

FIG. 2 is a view for explaining a communication method between the emergency alert and warning apparatuses shown in FIG. 1.

In FIG. 2, when the emergency alert and warning apparatus 100d determines that the traffic accident has occurred or the operation switch of the emergency alert and warning apparatus 100d is operated on the assumption that the vehicle progresses from right to left, the control unit of the emergency alert and warning apparatus 100d transmits traffic accident notification data to other neighboring emergency alert and warning apparatuses 100e and 100f through the antenna or the interface.

Here, it is possible to attach an ID assigned to each emergency alert and warning apparatus 100e, 100f to the traffic accident notification data so that only the emergency alert and warning apparatuses 100e and 100f near the traffic accident occurrence point can be notified, and it is also possible to attach the value specified in the brightness of the warning display unit together with the corresponding ID to the traffic accident notification data.

For example, the emergency alert and warning apparatus 100d transmits the traffic accident notification data by specifying the IDs and the brightness values (75%, 50%) of the emergency alert and warning apparatus 100e and 100f, the neighboring emergency alert and warning apparatus 100e receives the traffic accident notification data including the corresponding ID and the brightness (75%) in the control unit relays the traffic accident notification data including the ID and brightness (50%) not corresponding to itself to another emergency alert and warning apparatus 100f.

Thereby, the warning display unit of the emergency alert and warning apparatus 100f, which is far away from the point of the traffic accident, flashes at 50% brightness, the warning display unit of the emergency alert and warning apparatus 100e near the point of the traffic accident flashes at a brightness of 75%, and the warning display unit of the emergency alert and warning apparatus 100d at the point of the traffic accident flashes at a brightness of 100%.

Accordingly, the driver of the following vehicle senses that the brightness of the light is bright as the vehicle travels, confirming that it is close to the point of occurrence of the traffic accident, and further decelerates to drive carefully.

Figure 3:
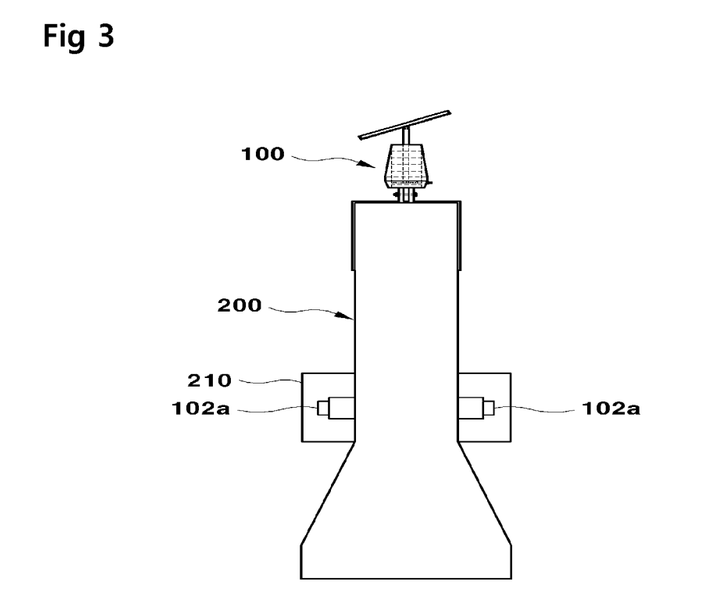
FIG. 3 is an exemplary view showing the emergency alert and warning apparatus of FIG. 1 provided in a median strip.
Figure 4:
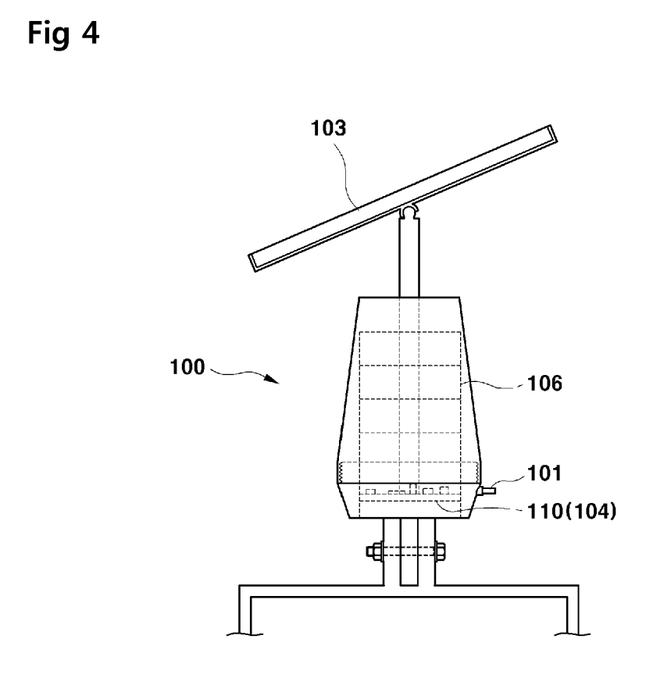
FIG. 4 is a partial enlarged view of FIG. 3.

FIG. 3 is an exemplary view showing the emergency alert and warning apparatus of FIG. 1 provided in a median strip; and FIG. 4 is a partial enlarged view of FIG. 3.

As shown in FIGS. 3 and 4, the emergency alert and warning apparatus 100 is installed at the upper portion of the median strip 200, wherein when the sensor unit 102 is an impact sensor 102a, it is installed on opposite sides of the middle height of the median strip 200 while being protected by a cushion member 210.

Further, it is shown that only one operation switch 101 is provided on the right side of the median strip 200, but one can be provided on the opposite side of the operation switch 101.

FIG. 3 is an exemplary view showing the emergency alert and warning apparatus 100 installed in the median strip 200, so the emergency alert and warning apparatus may be installed in the median strip 200 in various ways.

Figure 5:
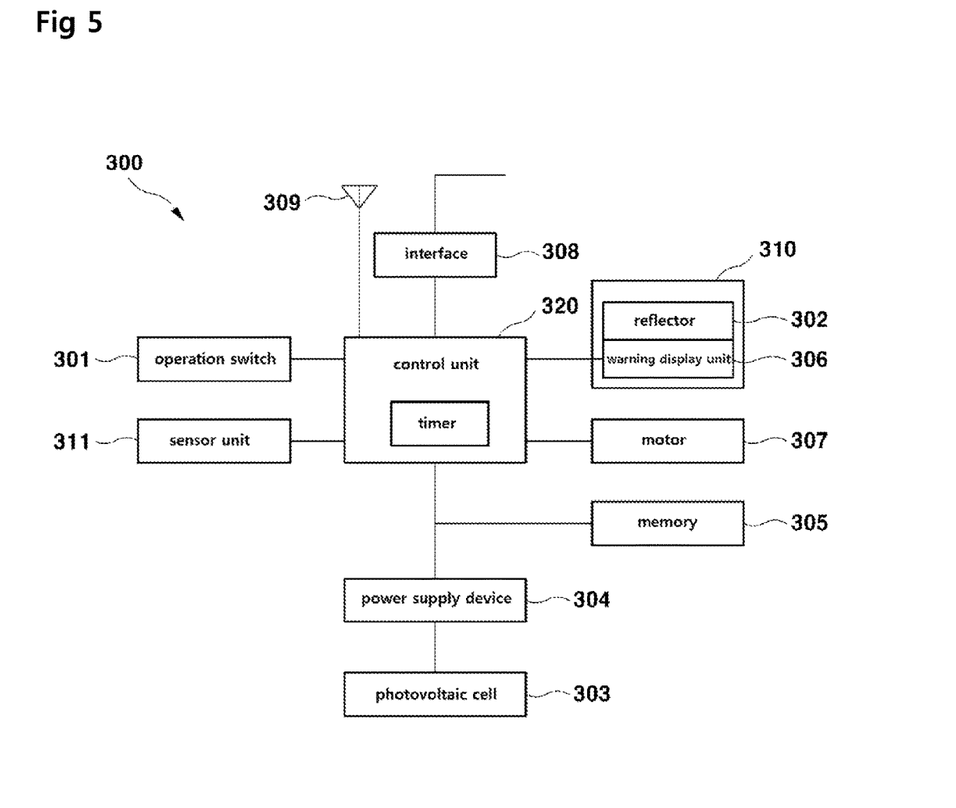
FIG. 5 is a block diagram showing a configuration of an emergency alert and warning apparatus according to another embodiment of the present invention.
Figure 6:
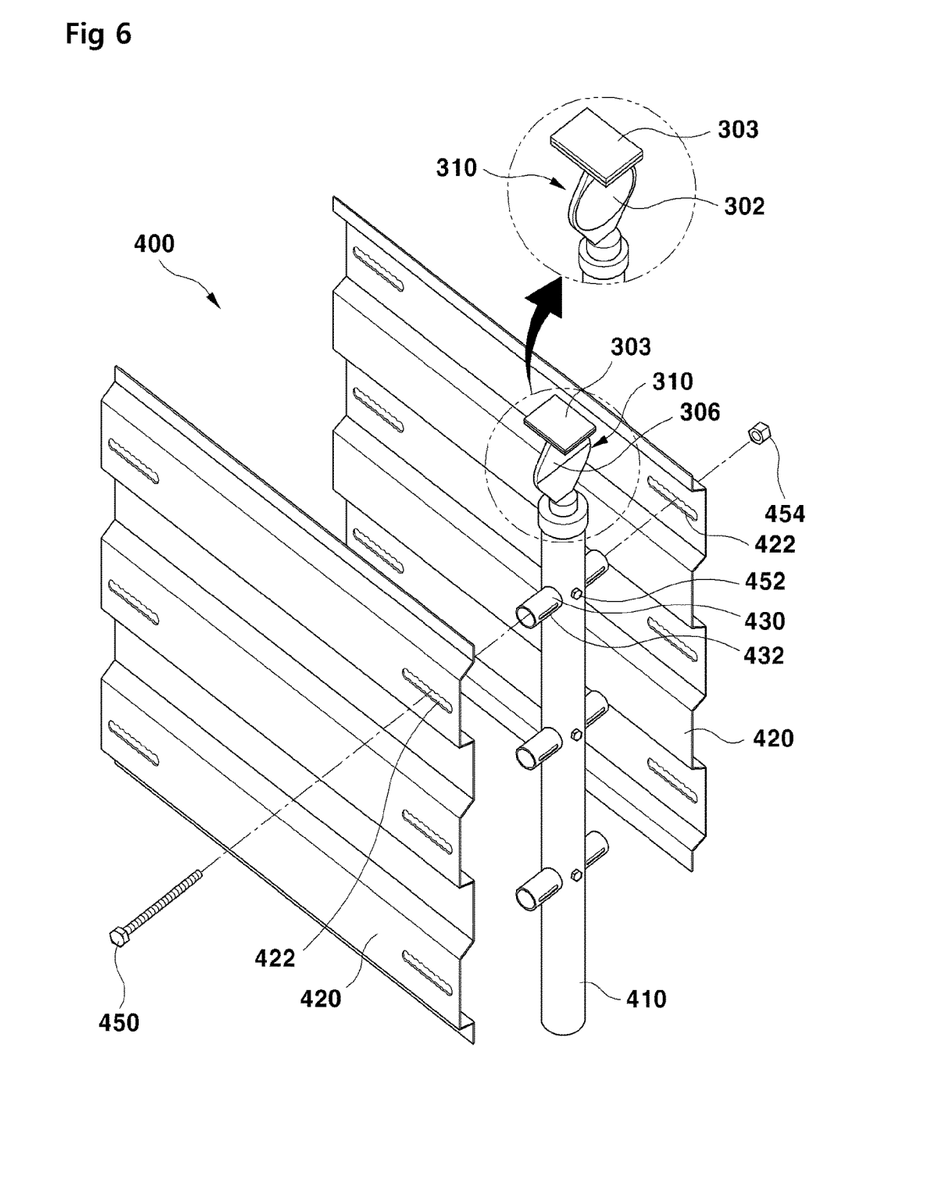
FIG. 6 is an exemplary view showing the emergency alert and warning apparatus of FIG. 5 provided in a median strip capable of absorbing shock.

FIG. 5 is a block diagram showing a configuration of an emergency alert and warning apparatus according to another embodiment of the present invention; and FIG. 6 is an exemplary view showing the emergency alert and warning apparatus of FIG. 5 provided in a median strip capable of absorbing shock.

As shown in FIG. 5, an emergency alert and warning apparatus 300 includes an operation switch 301, a reflector 302, a sensor unit 311, a photovoltaic cell 303, a power supply device 304, a memory 305, a warning display unit 306, a motor 307, an interface 308, an antenna 309, and a control unit 320.

The emergency alert and warning apparatus 300 is provided in a median strip or a guide rail of an expressway or the like, and each is assigned a unique ID.

The operation switch 301 generates an operation signal by the user's operation and outputs the same to the control unit 320. The user can be a driver or a passenger of the vehicle which had an accident or an eyewitness to the accident.

For example, the operation switch 301 may be a delineator 310 installed at an upper part of the median strip or the guide rail to reflect the light to the driver of the vehicle to allow the driver to recognize the boundary of the road.

The sensor unit 311 outputs a sensing signal to the control unit 320 by sensing the impact applied to the median strip or the guide rail due to an automobile accident, the speed or motion of the moving vehicle, and the brightness (illumination) of the surroundings.

The sensor unit 311 may include an impact sensor, a speed sensor, a motion sensor, and an illumination sensor. For example, in the case of the impact sensor, it is provided in a shock absorber 430 of the median strip or the guide rail.

The sensor unit 311 is provided in case the driver or passenger of the accident vehicle cannot operate the operation switch 301 due to a major traffic accident.

The power supply device 304 is a device for supplying power necessary for driving the emergency alert and warning apparatus 300.

The power supply device 304 may be constituted by a battery and a rechargeable battery, and other than these, it may be constituted by a secondary battery such as a lead battery, an alkaline battery, a gas battery, a lithium ion battery, a nickel hydrogen battery, a nickel cadmium battery, and a polymer battery.

The power supply device 304 can be charged by being supplied with power from the photovoltaic cell 103 or by being supplied with electricity from a commercial power source.

The photovoltaic cell 303 may be provided at an upper portion of the delineator 310 to face the sun.

The photovoltaic cell 303 converts solar energy into electric energy and processes the electric energy into a constant voltage, thereby supplying power to the power supply device 304.

The present invention is not limited thereto, and the photovoltaic cell 303 may supply power directly to the emergency alert and warning apparatus 300.

The warning display unit 306 is provided rearward or forward with respect to a traveling direction of a vehicle and is constituted by a plurality of LEDs (light emitting diodes), and further includes a cover member (not shown) covering the plurality of LEDs.

In the present invention, the warning display unit 306 may be provided by attaching red/green LEDs on the opposite side of the reflector 302 constituting the delineator 310.

The warning display unit 306 can be implemented in various sizes and shapes, and the cover member is made of a material and a color, which can be coupled with the warning display unit in various combinations, protect the LEDs from the outside environment, and improve the identification.

Further, the warning display unit 306 may display various characters, figures, arrows, or pictures as the LEDs flash sequentially or alternately by the control signal of the control unit 320 receiving the signals of the operation switch 301 and the sensor unit 311.

Further, the warning display unit 306 flashes at regular intervals by the control unit 320, thereby facilitating identification and adjusting the brightness (illumination) of the LEDs, and the emission color of the LEDs may be adjusted to enhance the identification. For example, red or yellow LEDs can be alternately arranged.

Further, if there is no signal from the operation switch 301 and the sensor unit 311 and no control signal from the control unit 320 is input, the warning display unit 306 is switched to an inactive mode to reduce the power consumption and increase the efficiency of the emergency alert and warning apparatus 300.

Further, switching between the inactive mode and the active mode of the warning display unit 306 is performed by the control unit 320.

The delineator 310 provided with the warning display unit 306 and the reflector 302 may be coupled to, for example, an upper portion of a strut 410 to extend and be shortened like an antenna or a fishing rod.

Accordingly, the height of the delineator 310 can be adjusted according to the conditions of the road.

Figure 7:
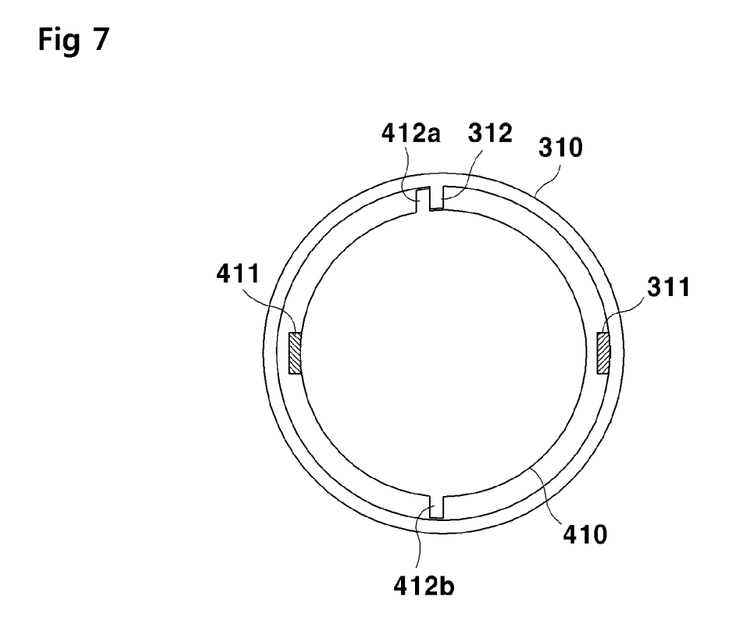
FIGS. 7 and 8 are views for explaining a function of an operation switch of a delineator shown in FIG. 6.
Figure 8:
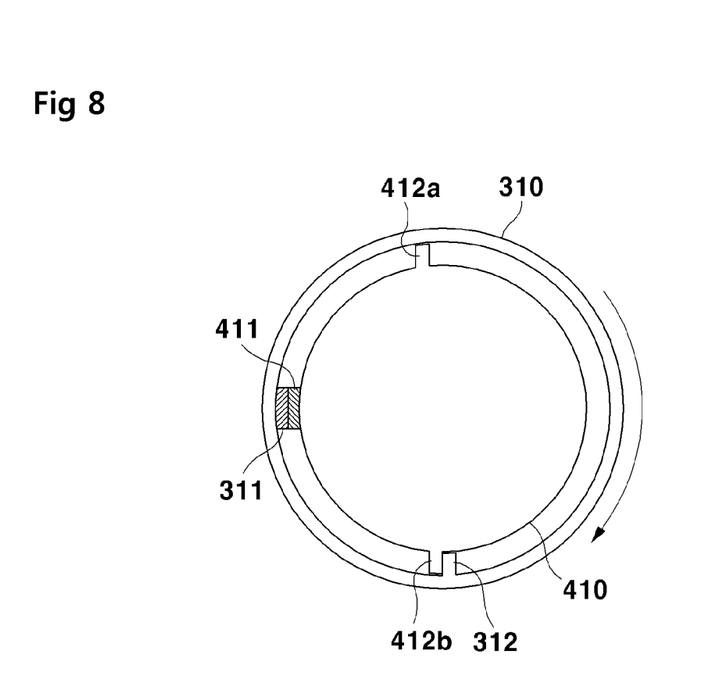

Further, as shown in FIGS. 7 and 8, the delineator 310 is coupled to the upper portion of the strut 310 so as to be rotatable for a predetermined angle (for example, about 180 degrees), and is connected to the shaft of the motor 307 via a speed reducer (not shown) to be rotated by the predetermined angle by the rotational force of the motor 307 or the force of a person.

Thereby, if a traffic accident occurs, the delineator 310 is rotated by 180 degrees such that the warning display unit 306 faces the driver instead of the reflector 302, and red/green LEDs of the warning display unit 306 are emitted to call the driver's attention thereto.

The memory 305 stores characters, figures, arrows, pictures, messages, warning siren, and reference values that are used as criteria for traffic accident judgment by the control signal of the control unit 320 and can be implemented by various storage media.

The interface 308 is connected to another neighboring emergency alert and warning apparatus through a wired line and performs wired communication.

Further, wireless communication is performed between neighboring emergency alert and warning apparatuses through the antenna 309, wherein various wireless communication methods are used as follows: Bluetooth, which connects electronic/information devices wirelessly within a range of 10 m to 100 m using 2.45 GHz frequency; Zigbee, which is one of the IEEE 802.15.4 standards supporting short distance communication; and laser communication, which uses an infrared ray as a wireless communication medium.

In particular, in the present invention, by transmitting signals (data) using a wireless (RF) relay scheme via the antenna 309 between neighboring emergency alert and warning apparatuses 300, the power consumption can be reduced accordingly.

The control unit 320 receives the operation signal of the operation switch 301 and the sensing signal of the sensor unit 311 to determine the accident situation of the vehicle, or daytime or nighttime.

For example, if the vehicle hits the median strip or the guide rail, the impact sensor constituting the sensor unit 311 senses an impact and transmits a sensing signal to the control unit 320, and in the control unit 320, the intensity of the impact is compared with the reference intensity stored in the memory 305. If the intensity is greater than the reference intensity, it is judged to be a traffic accident.

Further, the speed sensor constituting the sensor unit 311 senses the speed of the vehicle and transmits a sensing signal to the control unit 320, and in the control unit 320, if the driving speed is, for example, 0 km/h, it is judged as a traffic accident.

Further, the motion sensor constituting the sensor unit 311 senses the movement of the vehicle in motion and transmits a sensing signal to the control unit 320, and in the control unit 320, it is determined that there is a traffic accident if there is no vehicle movement.

Further, the illumination sensor constituting the sensor unit 311 measures the brightness (illumination) of the surroundings and transmits a sensing signal to the control unit 320, and in the control unit 320, the measured illumination is compared with the reference illumination stored in the memory 305, and if it is smaller than the reference illumination, it is determined to be the nighttime.

If it is determined that the traffic accident has occurred or the operation signal is input, the control unit 320 outputs a control signal to the warning display unit 306 and the motor 307, and switches the electrical signal or power such that the LEDs of the warning display unit 306 flash sequentially or alternately while the delineator 310 rotates by 180 degrees according to the control signal.

Here, the control unit 320 may cause the LED of the warning display unit 306 to vary in brightness depending on the brightness value.

For example, the LEDs flash at 100% brightness at night when brightness value is very low, 75% brightness at sunrise or sunset, and 50% in the bright daylight.

Further, the control unit 320 has a timer itself such that the warning display unit 306 emits light for a predetermined period of time, and the motor operated only at a predetermined time.

Further, the control unit 320 transmits the traffic accident notification data including the unique ID to the another neighboring emergency alert and warning apparatus 300 via the interface 108 or the antenna 109 in the relay manner, whereby it is possible to transmit the traffic accident notification data only to the emergency alert and warning apparatus 300 near the traffic accident corresponding to the ID.

As shown in FIG. 6, a median strip 400 capable of absorbing shock includes the strut 410, a separating plate 420, and the shock absorber 430.

The strut 410 is fixedly installed in the center of the road at predetermined intervals, and at least one tubular shock absorber 430 horizontally penetrates the strut to protrude at opposite sides thereof and is coupled to the by a fastening means 452.

The delineator 310 including the reflector 302 and the warning display unit 306 is retractably and rotatably coupled the upper portion of the strut 410.

The shock absorber 430 is disposed between a pair of separating plates 420 to be inclined in the traveling direction of the vehicle and penetrates the strut 410, and a wavy coupling hole 432 is formed to be horizontally long so as to absorb a shock and the fastening means 452 is engaged with the coupling hole 432.

Here, the fastening means 452 is not fully engaged with the coupling hole 432, but is engaged therewith to guide the movement of the coupling hole 432.

The shock absorber 430 may be provided with an impact sensor constituting the sensor unit 311.

The separating plate 420 is horizontally formed with a plurality of concave portions and convex portions and is fixedly coupled at opposite sides of the strut 410 to be deformed when the vehicle collides therewith, and here, the wavy coupling hole 432 is formed to be horizontally long along the road direction at the concave portions so as to absorb the impact of the vehicle.

In the state where coupling holes 422 formed in a pair of separating plates 420 are aligned with the outer sides of the tubular shock absorber 430 horizontally penetrating the strut 410, a bolt constituting the fastening means 450 is passed through the coupling hole 422 from a first side of the first separating plate, the tubular shock absorber 430 and the coupling hole 422 of the other separating plate, and then screwed to a nut 454 on a second side of the other separating plate, whereby the separating plates 420 are fixedly coupled to the opposite sides of the strut 410 to form the median strip 400.

When the vehicle collides with the median strip 400, the wavy coupling holes 432 formed in the shock absorber 430 are pushed by the collision of the vehicle based on the fastening means 452 coupled to the strut 410, and the separating plates 420 and the shock absorber 430 are moved together, thereby absorbing the shock. Further, based on the fastening means 450 coupled to the separating plates 420 and the shock absorber 430, as the wavy coupling holes 422 formed in the separating plate 420 are pushed by the collision of the vehicle, the separating plates 420 are moved, thereby absorbing the shock, which eventually absorbs the shock doubly.

FIGS. 7 and 8 are views for explaining a function of an operation switch of a delineator shown in FIG. 6.

As shown in the drawings, in the state where the inside of the delineator 310 and the outside of the strut 410 are provided with contact terminals 311 and 411, respectively, the delineator 310 is rotatably coupled to the upper portion of the strut 410.

Here, stoppers 412a and 412b are formed at an interval of about 180 degrees on the outside of the strut 410 and a protrusion 312 is formed inside the delineator 310.

As shown in FIG. 7, when the protrusion 312 of the delineator 310 is stopped by the stopper 412a of the strut 410, the contact terminals 313 and 411 are in a state of being apart (here, the reflector faces the driver), the operation signal is not output to the control unit 320. As shown in FIG. 8, after a traffic accident occurs, when the delineator 310 is rotated by 180 degrees (here, the warning display unit faces the driver) by the user rotating the delineator 310, the protrusion 312 of the delineator 310 is stopped by the stopper 412b of the strut 410, and the contact terminals 313 and 411 are brought into contact with each other, and the operation signal is output to the control unit 320.

As described above, the function of the operation switch 301 can be performed by the coupling of the delineator 310 and the strut.

Figure 9:
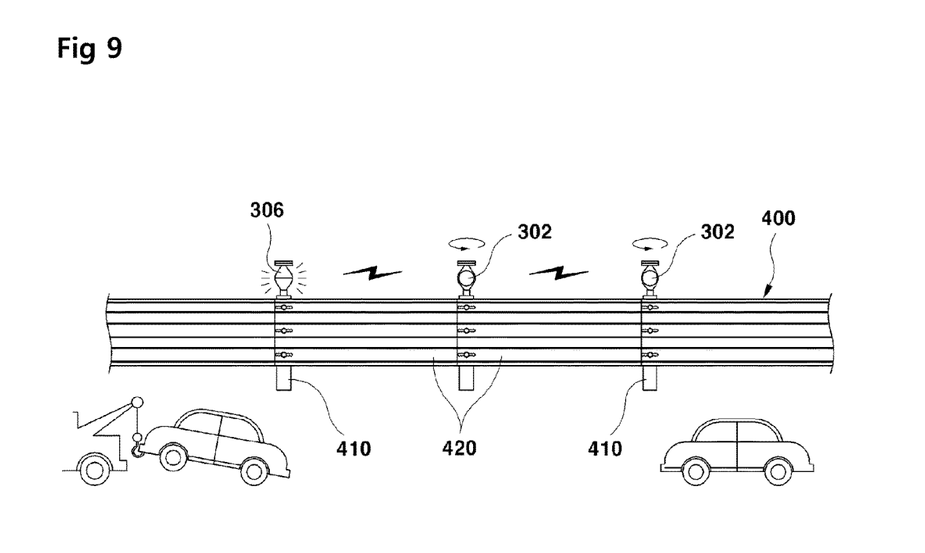
FIG. 9 is a view showing an emergency alert situation using the delineator provided in the median strip of FIG. 6.

FIG. 9 is a view showing an emergency alert situation using the delineator provided in the median strip of FIG. 6.

In a state where the delineator 310 provided with the LED warning display unit 306 is rotatably coupled to the upper portion of the strut 410 of the median strip 400 on the opposite side of the reflector 302, the reflector 302 is normally directed toward the driver.

If the user operates the operation switch 301 near the accident or the delineator 310 performing the operation switch function when a traffic accident occurs, the delineator 310 is rotated by 180 degrees and the warning display unit 306 facing the driver emits light under the control of the control unit 320.

Further, the control unit 320 relays the traffic accident notification data by specifying an ID to another neighboring emergency alert and warning apparatus 300 via the antenna 309 or the interface 308.

Thereby, the another emergency alert and warning apparatus 300 relays the traffic accident notification data to a further emergency alert and warning apparatus 300, the delineator 310 is rotated by 180 degrees by the rotation of the motor 307, and then the warning display unit 306 emits light.

Thus, by relaying the traffic accident notification data, the warning display unit 306 is sequentially rotated and emits light, thereby informing the driver behind the traffic accident of the traffic accident so that the driver can drive carefully.

In the control unit 320, the timer is used to check the time, and after a predetermined time passes, the light emission of the warning display unit 306 is stopped, and the delineator 310 is rotated to its original position by using the motor 307 so that the reflector 302 faces the driver.

The invention claimed is:

1. An emergency alert and warning apparatus, which is provided on a median strip or a guide rail of a road at predetermined intervals, the emergency alert and warning apparatus comprising:
   an operation switch allowing a user to manually generate an operation signal to a control unit indicating a traffic accident occurs;
   a sensor unit outputting a sensing signal, indicating of the traffic accident occurs, to the control unit by sensing an impact applied to the median strip or the guide rail, a speed or motion of a vehicle on the road;
   the control unit receiving at least one of the operation signal and the sensing signal to output a control signal;
   a warning display unit including a plurality of LEDs and being turned on and off in response to the control signal of the control unit to inform the traffic accident; and
   a photovoltaic cell converting solar energy into electric energy and changing the electric energy into a constant voltage to supply power to the emergency alert and warning apparatus,
   wherein a unique identification (ID) is assigned to the emergency alert and warning apparatus and the control unit of the emergency alert and warning apparatus adds unique IDs and a corresponding brightness value of a warning display unit to each unique ID of another neighboring emergency alert and warning apparatuses to traffic accident notification data and relays the traffic accident notification data to the another neighboring emergency alert and warning apparatuses,
   wherein each control unit of the another neighboring emergency alert and warning apparatuses outputting a control signal to activate the corresponding warning display unit at the corresponding brightness value specified in the traffic accident notification data when the traffic accident notification data includes the corresponding unique ID of the another neighboring emergency alert and warning apparatus, and relays the traffic accident notification data having no corresponding ID to a further neighboring emergency alert and warning apparatus, whereby the traffic accident notification data is rearward transmitted only to the another emergency alert and warning apparatuses near the traffic accident having the unique IDs of the another neighboring emergency alert and warning apparatuses added to the traffic accident notification data, and
   the warning display unit of each of the emergency alert and warning apparatuses is provided on a side opposite to a reflector of a delineator, the delineator is coupled to an upper portion of a strut of the median strip or the guide rail to be retractable like an antenna while being rotated at a predetermined angle in response to the accident occurs to inform drivers on the road behind the traffic accident.

2. The emergency alert and warning apparatus of claim 1, wherein an inside of the delineator and an outside of the strut are provided with contact terminals, and the contact terminals are brought into contact with each other or separated from each other by a rotation of the delineator to perform a function of the operation switch.

3. The emergency alert and warning apparatus of claim 1, wherein the delineator is configured such that the reflector normally faces a driver, and when the traffic accident occurs, the delineator is rotated at the predetermined angle by a motor such that the warning display unit faces the drivers and then emits or flashes the plurality of LEDs.

4. The emergency alert and warning apparatus of claim 3, wherein the control unit is provided with a timer to control the warning display unit and the motor to be operated at a predetermined time.

5. The emergency alert and warning apparatus of claim 1, wherein the median strip or the guide rail is provided with a separating plate coupled to at least one side of the strut to be deformed when the vehicle collides therewith, and the separating plate is provided with a wavy first coupling hole to be horizontally long such that the separating plate is coupled to the strut by a first fastening means.

6. The emergency alert and warning apparatus of claim 5, wherein the median strip or the guide rail is provided with a shock absorber horizontally penetrating at least one side of the strut, and the shock absorber is in a tubular shape and is provided with a wavy second coupling hole to be horizontally long such that the separating plate is coupled to the strut by a second fastening means, with the first fastening means protruding from a second side of the shock absorber through a first side thereof.

7. The emergency alert and warning apparatus of claim 1, further comprising:

a warning sound output unit constituted by a speaker or a buzzer to output an announcement or a warning siren informing the traffic accident by the control signal of the control unit.

8. The emergency alert and warning apparatus of claim 7, wherein the control unit is provided with a timer to control the warning display unit and the warning sound output unit to be operated for a predetermined period of time.

9. The emergency alert and warning apparatus of claim 1, further comprising:

a power supply device in a form of a battery or a rechargeable battery and configured to be charged by using constant voltage power supply of the photovoltaic cell and supply charged power to the emergency alert and warning apparatus.

10. The emergency alert and warning apparatus of claim 1, wherein the adjacent neighboring emergency alert and warning apparatuses are more distant from a point of the traffic accident, the brightness values are more less compared to a brightness value of the warning display unit of the emergency alert and warning apparatus.

* * * * *